US012084792B2

(12) United States Patent
Meinecke

(10) Patent No.: US 12,084,792 B2
(45) Date of Patent: Sep. 10, 2024

(54) FURNACE AND METHOD FOR TREATING MATERIAL

(71) Applicant: ONEJOON GMBH, Bovenden (DE)

(72) Inventor: Lars Meinecke, Reutlingen (DE)

(73) Assignee: ONEJOON GMBH, Bovenden (DE)

( * ) Notice: Subject to any disclaimer, the term of this patent is extended or adjusted under 35 U.S.C. 154(b) by 723 days.

(21) Appl. No.: 16/755,286

(22) PCT Filed: Oct. 12, 2018

(86) PCT No.: PCT/EP2018/077920
§ 371 (c)(1),
(2) Date: Apr. 10, 2020

(87) PCT Pub. No.: WO2019/073053
PCT Pub. Date: Apr. 18, 2019

(65) Prior Publication Data

US 2021/0222331 A1 Jul. 22, 2021

(30) Foreign Application Priority Data

Oct. 12, 2017 (DE) ......................... 102017123739.9

(51) Int. Cl.

*D01F 9/32* (2006.01)
*F27D 1/18* (2006.01)
*F27B 9/28* (2006.01)

(52) U.S. Cl.

CPC ............. *D01F 9/32* (2013.01); *F27D 1/1858* (2013.01); *F27B 9/28* (2013.01); *F27D 1/18* (2013.01);

(Continued)

(58) Field of Classification Search

CPC . D01F 9/32; F27B 9/28; F27D 1/1858; F27D 2001/1891; F27D 1/18; F27D 1/1866; F27D 2001/1875

(Continued)

(56) References Cited

U.S. PATENT DOCUMENTS 8,955,235 B2 2/2015 Berner
9,139,936 B2 9/2015 Meinecke et al.

(Continued)

FOREIGN PATENT DOCUMENTS

CN 102753741 A 10/2012
CN 102758270 A 10/2012

(Continued)

OTHER PUBLICATIONS

Translation of JP2001316946A (Year: 2001).*

(Continued)

*Primary Examiner* — Steven B McAllister
*Assistant Examiner* — Benjamin W Johnson
(74) *Attorney, Agent, or Firm* — Lempia Summerfield Katz LLC

(57) ABSTRACT

The invention relates to a furnace for the treatment of material, in particular for the oxidative treatment of fiber material, in particular for producing carbon fibers, comprising a housing (12) having a housing inner space (14), which is gas-tight with the exception of passage areas (18, 20) for the fibers (22). In the housing inner space (14) of the housing (12), a process chamber (28) is located. A hot working atmosphere (40) can be generated by means of an atmosphere device (42). The atmosphere device (42) comprises a flow system (46) having flow channels (48), which are arranged in the housing inner space (14) each defining one flow chamber (50), and are provided with flow passages such that the respective flow chambers (50) are fluidically (Continued)

connected to the process chamber (28) in such a way that hot working atmosphere (40) can be delivered to the process chamber (28) in at least one main flow direction (44) and can be discharged from the process chamber (28). A revision system (72) is provided, through which flow chambers (50) of flow channels (48) are accessible through the housing (12).

16 Claims, 7 Drawing Sheets

(52) U.S. Cl.
CPC .... *F27D 1/1866* (2013.01); *F27D 2001/1875* (2013.01); *F27D 2001/1891* (2013.01)

(58) Field of Classification Search
USPC ........................................................ 423/447.1
See application file for complete search history.

(56) References Cited

U.S. PATENT DOCUMENTS

| | | | | |
|---|---|---|---|---|
| 9,303,921 | B2 | 4/2016 | Berner | |
| 9,441,881 | B2 | 9/2016 | Berner | |
| 11,236,444 | B2 | 2/2022 | Meinecke | |
| 2012/0304479 | A1 | 12/2012 | Berner | |
| 2012/0304480 | A1 | 12/2012 | Berner | |
| 2013/0171578 | A1 | 7/2013 | Berner | |
| 2014/0026437 | A1 | 1/2014 | Meinecke et al. | |
| 2015/0168070 | A1* | 6/2015 | Trent, Jr. | F27D 19/00 432/250 |
| 2016/0209115 | A1* | 7/2016 | Berner | D01F 9/32 |
| 2017/0145598 | A1 | 5/2017 | Meinecke | |
| 2019/0078234 | A1* | 3/2019 | Torres Martinez | D01D 10/04 |

FOREIGN PATENT DOCUMENTS

| | | | | |
|---|---|---|---|---|
| CN | 103080391 | A | | 5/2013 |
| CN | 106461332 | A | | 2/2017 |
| DE | 102014009244 | A1 | | 1/2016 |
| JP | 2001316946 | A | * | 11/2001 |
| JP | 2006028680 | A | | 2/2006 |
| RU | 2585644 | C2 | | 5/2016 |
| WO | 2015192962 | A1 | | 12/2015 |

OTHER PUBLICATIONS

German Search Report 04062018 cited in corresponding German Application No. 102017123739.9; Apr. 6, 2018; 5pp.
Internet translation of German Search Report cited in corresponding German Application No. 102017123739.9; 7 pp.
ISR 12072018, International Search Report cited in corresponding International App No. PCT/EP2018/077920; Dec. 7, 2018; 4 pp.
Office Action cited in corresponding Chinese patent application No. 201880066571.1; Mar. 2, 2022; 15 pp.
Search Report cited in Russian patent application No. 2020115023/05(024938); Jan. 19, 2022; 6 pp.

* cited by examiner

FURNACE AND METHOD FOR TREATING MATERIAL

RELATED APPLICATION DATA

This application is a U.S. national stage of and claims priority benefit to prior filed international application no. PCT/EP2018/077920, filed Oct. 12, 2018, and which claims priority to German national application no. 10 2017 123 739.9, filed Oct. 12, 2017. The entire contents of these prior filed applications are hereby incorporated by reference herein.

BACKGROUND

1. Field of the Disclosure

The invention relates to a furnace for the treatment of material, in particular for the oxidative treatment of fiber material, in particular for the production of carbon fibers, with a) a housing with a housing interior space which is gas-tight apart from passage regions for the fibers;

b) a process space which is situated in the housing interior space of the housing;

c) an atmosphere device, by means of which a hot working atmosphere can be generated and which comprises a flow system with flow ducts which are arranged in the housing interior space, delimit in each case one flow space, and have flow passages, with the result that the respective flow spaces are connected in flow terms to the process space in such a way that hot working atmosphere can be fed to the process space with at least one main flow direction and can be discharged from the process space.

Moreover, the invention relates to a method for the treatment of material.

2. Description of Related Art

In the case of furnaces of the type mentioned at the outset which are known from the marketplace and are used for the oxidative treatment of carbon fibers, the flow ducts are configured, for example, as blower boxes of a blower device and as suction boxes of a suction device, by way of which the working atmosphere is circulated through the process space.

The flow spaces of the flow ducts are contaminated over the course of time, fiber material being deposited, in particular, in flow ducts of this type, through which the working atmosphere is sucked from the process space. The fiber material is released in the process space, and is received and discharged by the circulated working atmosphere. Therefore, the flow ducts and/or their flow spaces have to be checked and cleaned at regular intervals within the context of an overhaul.

In the case of the oxidation furnaces which are known from the marketplace, the flow spaces are accessible only through the flow passages which for their part can be reached only from the process space. To this end, furnaces of this type have an entrance to the process space, through which a worker can enter into the process space and can manually clean the flow spaces of the flow ducts there. The flow passages of the flow ducts are as a rule equipped with flow flaps, in order to set the flow direction and/or the flow volume. Flow flaps of this type are moved for the cleaning operation into a cleaning position, in which the flow passages are open as far as possible, in order to provide the worker with largely barrier-free access to the flow spaces of the flow ducts. After the cleaning operation, the flow flaps are moved into their operating position again. There is always the risk here of an incorrect setting of the flow flaps.

The flow passages of the flow ducts are usually comparatively narrow, however, with the result that the access to the flow spaces of the flow ducts overall is restricted. In addition, the space conditions in the process space are as a rule rather constricted, and the visibility conditions in the process space are rather unfavorable, with the result that the cleaning can be difficult and the cleaning result can be checked only unsatisfactorily. Before the cleaning operation, the worker also has to wait until an acceptable temperature prevails in the process space, in order for it to be possible for said process space to be entered.

SUMMARY

It is an object of the invention to provide a furnace and a method for the treatment of material of the type mentioned at the outset which take these notions into consideration.

Said object is achieved in the case of a furnace of the type mentioned at the outset by virtue of the fact that d) there is an overhaul system, by way of which flow spaces of flow ducts are accessible through the housing.

According to the invention, it is made possible as a result that a worker no longer has to enter the process space, in order to obtain access to the flow spaces of flow ducts. The space and visibility conditions for the worker are improved considerably in the case of cleaning from outside the housing. Cleaning can also already be begun when relatively high temperatures which would not be acceptable for the worker still prevail in the process space. Readjusting of the flow flaps can also be dispensed with, with the result that the risk of an incorrect setting of the flow flaps which follows the cleaning is also eliminated.

It is favorable if a) flow ducts comprise at least one overhaul entrance to the flow space;

b) the housing comprises at least one overhaul inlet which defines an inner side which faces the process space and on which flow ducts are arranged in such a way that their overhaul entrances can be reached through the overhaul inlet.

In known furnaces, the flow ducts extend between side walls of the housing. Therefore, it is particularly favorable if a respective flow duct in the direction transversely with respect to the main flow direction defines a longitudinal axis and a first end side and an opposite second end side, and an overhaul entrance is provided on the first and/or the second end side. The access then therefore takes place on at least one end side of the flow duct.

A respective flow duct is preferably connected on its first end side and/or on its second end side in a gas-tight manner to an overhaul inlet of the housing.

The housing preferably comprises at least one overhaul inlet in a side wall. This likewise takes into consideration the above-described arrangement of the flow ducts between the side walls of the housing.

It is advantageous for flexible access if the overhaul inlet comprises a housing passage in the housing and an overhaul gate device, by way of which the housing passage can be opened or can be closed.

Here, the overhaul gate device preferably comprises an overhaul door which is mounted by way of a bearing device which is set up in such a way that the overhaul door can be moved into the housing passage and out of the latter again in a pivotable manner about an, in particular, vertical pivot axis and/or with a horizontal longitudinal movement.

It is favorable in practice if the flow ducts which are arranged on the inner side of the overhaul inlet have a duct passage opening, and the overhaul system comprises a sealing arrangement, by means of which one or more of the duct passage openings can be opened or can be closed.

As alternatives, it is advantageous if the sealing arrangement is set up in such a way that the duct passage openings of the flow ducts which are arranged on the inner side of the overhaul inlet can be opened or can be closed only all at the same time or in groups independently of one another or individually independently of one another. Different sealing arrangements can be provided at various overhaul inlets of the housing.

If the overhaul door moves the sealing arrangement with it, a separate fastening of the sealing arrangement can be dispensed with. The sealing arrangement then does not have to be removed separately and fastened again after the cleaning operation.

If the overhaul system comprises an automated cleaning device, the flow spaces can be cleaned with a quality which is consistent in an automated manner.

In the case of the method mentioned at the outset, the abovementioned object is achieved by virtue of the fact that the fibers are treated in a furnace with some or all of the above-described features.

BRIEF DESCRIPTION OF THE DRAWINGS

In the following text, exemplary embodiments of the invention will be described in greater detail on the basis of the drawings, in which.

DETAILED DESCRIPTION

Figure 1:
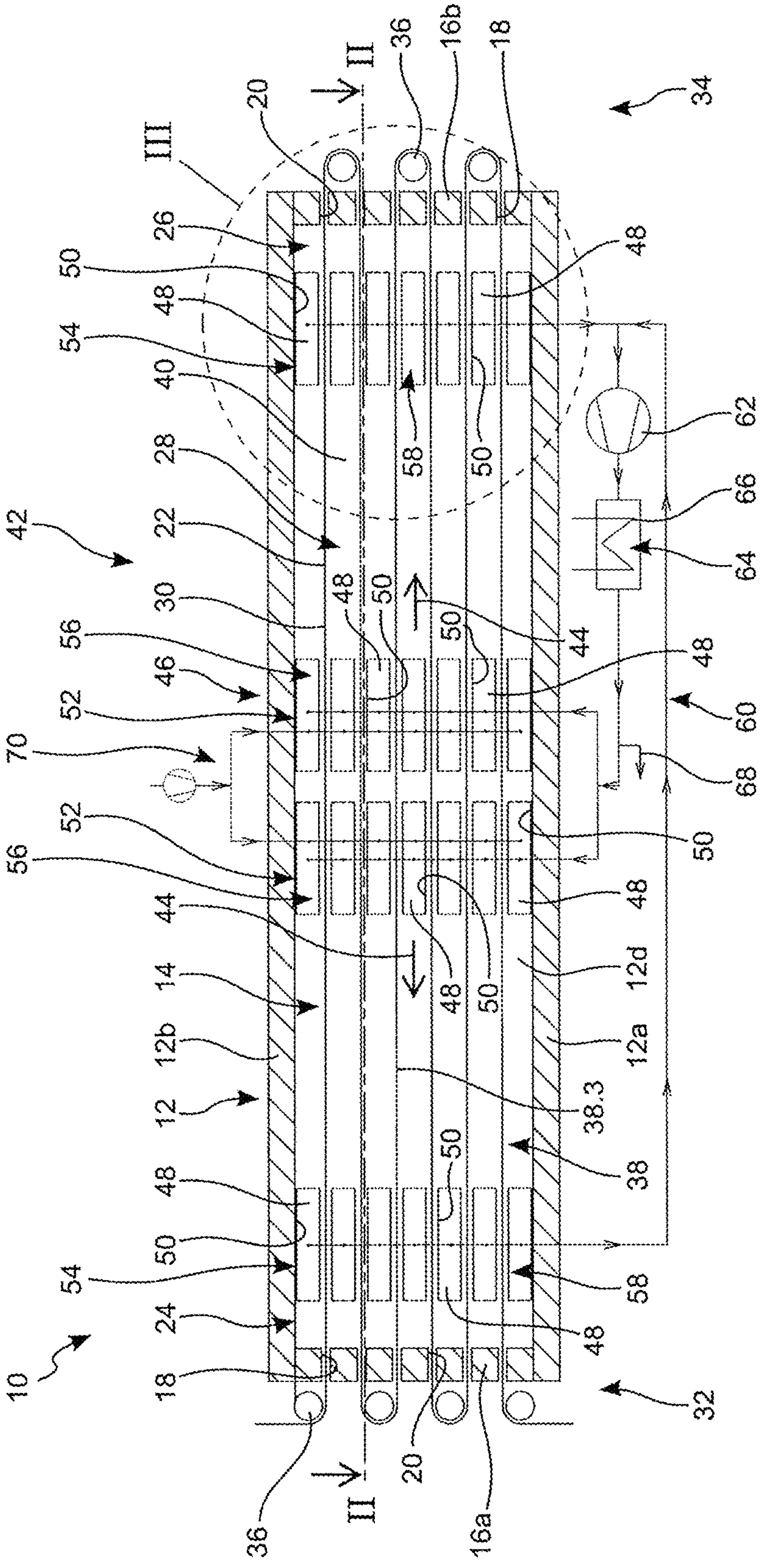
FIG. 1 shows a vertical longitudinal section of an oxidation furnace for the production of carbon fibers along the sectional line I-I in FIG. 2, which oxidation furnace comprises a housing which delimits a process space, through which a hot working atmosphere is circulated by means of flow ducts which extend between side walls of the housing.
Figure 2:
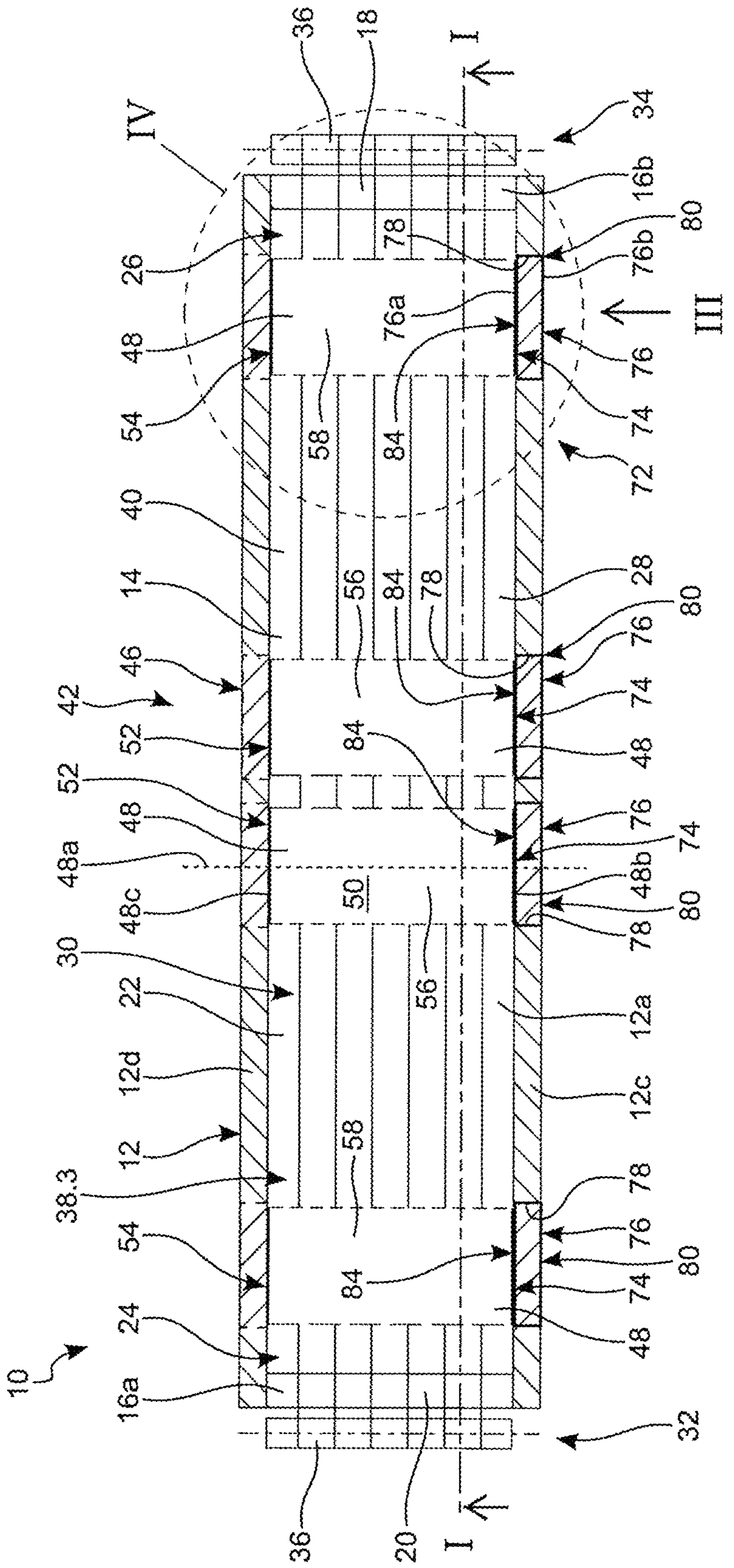
FIG. 2 shows a horizontal section of the oxidation furnace according to FIG. 1 along the sectional line II-II there, an overhaul system with overhaul inlets in the housing and overhaul entrances of the flow ducts being shown, with the result that inner flow spaces of one or more flow ducts are accessible through the housing.
Figure 3:
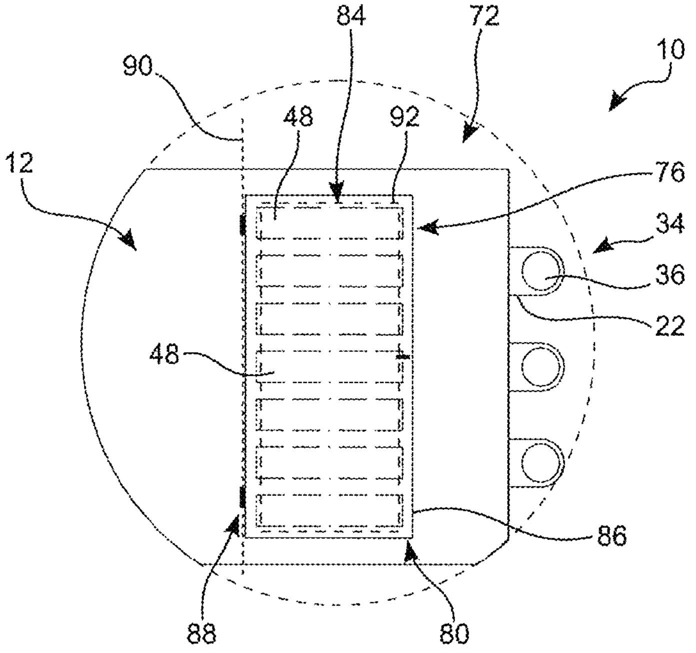
FIG. 3 shows that detail of the vertical section which is denoted by III in FIG. 1 from the viewing direction of the arrow III in FIG. 2, an overhaul system being shown which comprises an overhaul gate device in the form of an overhaul door in the side wall of the housing, which overhaul door is shown transparently and behind which a sealing arrangement and flow ducts can be seen.
Figure 4:
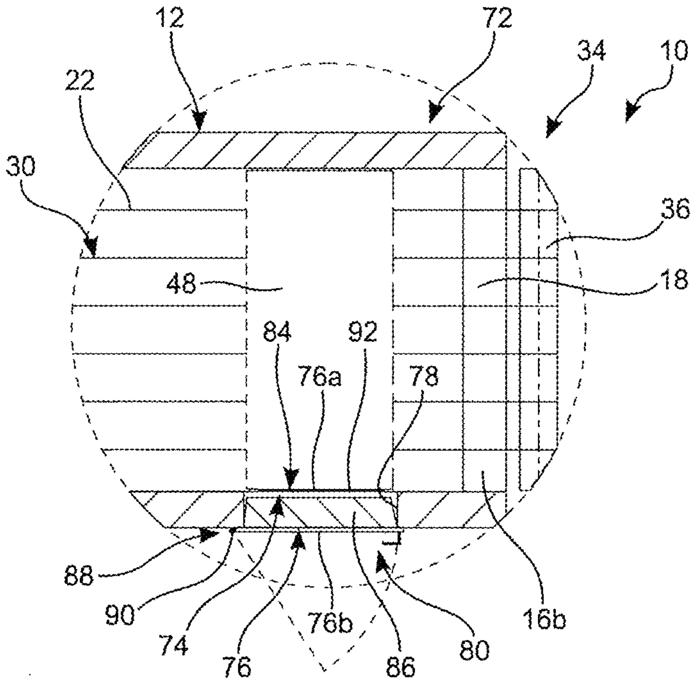
FIG. 4 shows that detail of the horizontal section which is denoted by IV in FIG. 2, the function of the overhaul door of the overhaul system being illustrated.
Figure 5:
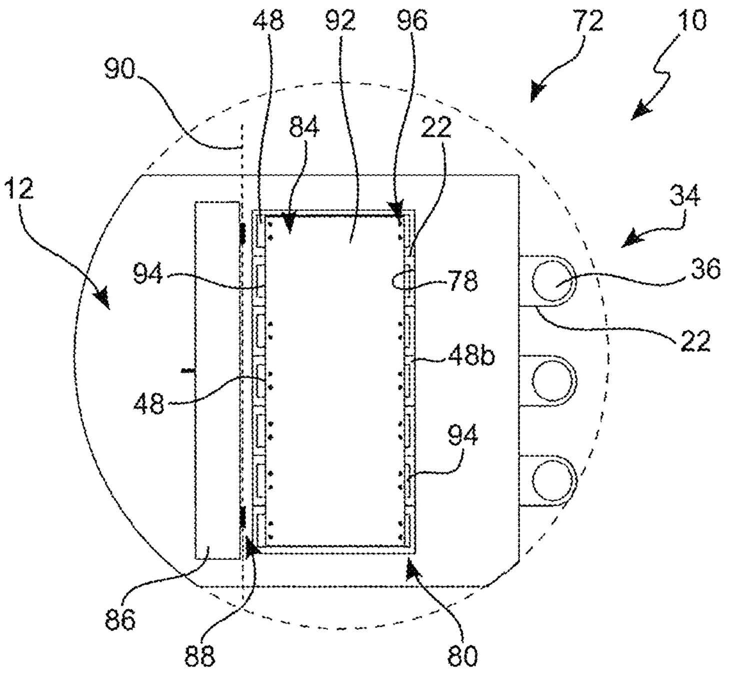
FIG. 5 shows the detail which is shown in FIG. 3 with an open overhaul door of the overhaul system, it being possible for a sealing arrangement to be seen which closes duct passage openings on the end side of all flow ducts by way of a single covering element.

FIGS. 1 and 2 show a vertical longitudinal section and a horizontal section, respectively, of a furnace for the treatment of material, which furnace is illustrated by way of example as an oxidation furnace 10 which is used for the production of carbon fibers and in which fiber material is treated in an oxidative manner. The oxidation furnace 10 comprises a housing 12 which delimits a passage space which forms the housing interior space 14 of the oxidation furnace 10 by way of a bottom wall 12*a*, a top wall 12*b* and two side walls 12*c* and 12*d*.

The housing 12 which delimits the housing interior space 14 can at the same time form the outer housing of the oxidation furnace. As an alternative, said housing 12 can form an inner housing shell and for its part can be surrounded by one or more outer housing shells.

At its front ends, the housing 12 has in each case one end wall 16*a*, 16*b*, there being passage openings in the form of horizontal inlet slots 18 and outlet slots 20 in the end wall 16*a* in a manner which alternates from bottom to top, and there being passage openings in the form of horizontal outlet slots 20 and inlet slots 18 in the opposite end wall 16*b* in a manner which alternates from bottom to top, which passage openings do not all have a designation for the sake of clarity. Fibers 22 are guided into the housing interior space 14 and out of the latter again through the inlet and outlet slots 18 and 20, respectively. In general, the inlet and outlet slots 18, 20 form passage regions of the housing 12 for carbon fibers 22. Apart from said passage openings, the housing 12 of the oxidation furnace 10 is gas-tight.

For its part, the housing interior space 14 is divided in the longitudinal direction into three regions, and comprises a first prechamber 24 which is arranged directly next to the end wall 16*a*, and a second prechamber 26 which is directly adjacent next to the opposite end wall 16*b*. A process space 28 which is located between the prechambers 24, 26 in the present exemplary embodiment is situated in the housing interior space 14.

The prechambers 24 and 26 thus at the same time form an inlet and outlet port for the fibers 22 into the housing interior space 14 or the process space 28.

The carbon fibers 22 to be treated are fed to the housing interior space 14 of the oxidation furnace 10 so as to run in parallel as a type of fiber carpet 30. To this end, the fibers 22 enter from a first deflection region 32 which lies next to the end wall 16*a* outside the housing 12 through the uppermost inlet slot 18 in the end wall 16*a* into the prechamber 24. The fibers 22 are then guided through the process space 28 and through the opposite prechamber 26 to a second deflection region 34 which lies next to the end wall 16*b* outside the housing 12, and from there are returned again.

Overall, the fibers 22 pass through the process space 28 in a serpentine manner over deflection rollers 36 which follow one another from top to bottom and of which merely two have a designation. The fiber carpet 30 which is formed by way of the multiplicity of fibers 22 which run next to one another in each case defines a plane 38 between the deflection rollers 36. In the case of the exemplary embodiment which is shown in FIG. 1, there are six planes 38 of this type. The course of the fibers 22 can also run from bottom to top, and more or fewer planes 38 than shown in FIG. 1 can also be defined. In FIG. 2, the third plane 38.3 (as viewed from above) can be seen which is also labeled in this way in FIG. 1, only a few fibers 22 being shown at a great spacing, in order to indicate the fiber carpet 30; in practice, the fibers 22 in one plane 38 of the fiber carpet 30 run at only a small spacing from one another.

After the entire passage through the process space 28, the fibers 22 leave the oxidation furnace 10 in the case of the present exemplary embodiment through the lowermost outlet slot 20 in the end wall 16*a*. Before reaching the uppermost inlet slot 18 in the end wall 16*b* and after leaving the oxidation furnace 10 through the lowermost outlet slot 20 in the end wall 16*b*, the fibers 22 are guided outside the housing 12 over further guide rollers (not shown specifically).

Under process conditions, the process space 28 is flowed through by a hot working atmosphere 40 which is built up by way of an atmosphere device 42. In general terms, the hot working atmosphere 40 can be generated by way of the atmosphere device 42 and can be guided through the process space 28, with the result that it flows through the process space 28 under process conditions. In practice, the working atmosphere is air, for which reason the term air is also selected in the further text synonymously for all gases which contribute to the atmospheric balance of the oxidation furnace 10, and process air, circulating air, waste air, fresh air and the like are mentioned; other gases can also be conducted through the process space 28, however.

In the process space 28, two air flows in opposite directions with in each case one main flow direction 44 are maintained. For this purpose, the atmosphere device 42 comprises a flow system 46 with flow ducts 48 which are arranged in the housing interior space 14 and in each case delimit a flow space 50, and by means of which flow ducts 48 working atmosphere 40 can be guided through the process space 28.

In order to generate the air flows in opposite directions, the flow system 46 comprises two blower devices 52 in the central region of the process space 28 and in each case one suction device 54 in the two end regions on the end sides of the process space 28. The suction devices 54 are arranged in each case adjacently with respect to the prechambers 24, 26. The blower devices 52 in each case comprise the abovementioned flow ducts 48 in the form of in each case a plurality of blower ducts 56, and the suction devices 54 comprise in each case the abovementioned flow ducts 48 in the form of in each case a plurality of suction ducts 58. The flow ducts 48 (that is to say, the blower ducts 56 and the suction ducts 58 here) are arranged in each case between the planes 38 which are defined by way of the fiber carpet 30, and extend transversely with respect to the main flow direction 44, with the result that the flow ducts 48 in the direction transversely with respect to the main flow direction 44 define a longitudinal axis 48*a* and a first end side 48*b* and an opposite end side 48*c* which are illustrated merely in FIG. 2 and therein only in the case of one flow duct 48.

In the case of the exemplary embodiment which is described here, transversely with respect to the main flow direction 44 means at a right angle with respect to the main flow direction 44. In the case of modifications which are not shown, however, the flow ducts 48 can also run obliquely and not at a right angle with respect to the main flow direction 44.

In the case of the present exemplary embodiment, the flow ducts 48 extend between the side walls 12*c* and 12*d* of the housing 12. Along said direction of extent of their longitudinal axis 48*a*, the flow ducts 48 have in each case flow passages which cannot be seen in the figures on account of the sections, with the result that the respective flow spaces 50 of the flow ducts 48 are connected in flow terms to the process space 28 in such a way that working atmosphere 40 is fed to the process space 28 or is discharged from the process space 28. Flow flaps which can be adjusted in a manner known per se are arranged in the flow passages, as was described at the outset.

In the case of the blower ducts 56, said flow passages as a result form blower openings, through which process air passes from the respective flow space 50 of the blower ducts 56 into the process space 28. In the case of the suction ducts 58, said flow passages form suction openings in a corresponding way, through which the atmosphere flows from the process space 28 into the respective flow space 50 of the suction ducts 58.

In the case of the oxidation furnace 10 which is shown here, the blower ducts 56 and the suction ducts 58 are configured as a blower box and as a suction box, respectively, and therefore as box-shaped flow ducts. Geometries which differ herefrom are readily possible, however.

For conditioning by way of the atmosphere device 42, the working atmosphere 40 is conveyed between the suction devices 54 and the blower devices 52 through a circulating line 60 with a fan 62, and in the process flows through a conditioning device 64. The conditioning device 64 is illustrated by way of example as a heat exchanger 66, since, in particular, the temperature of the working atmosphere 40 is set as conditioning. Upstream of the conditioning device 64, a waste air line 68 with a valve (not shown specifically) branches off from the circulating line 60, via which waste air line 68 a proportion of the circulated working atmosphere 40 can be discharged.

In order to maintain the air balance of the oxidation furnace 10, the waste air volume which flows out proportionally is compensated for by way of a fresh air feeding device 70, by means of which fresh air can be fed to the blower devices 52.

Overall, therefore, two circulating air circuits are closed, and the oxidation furnace 10 is operated in flow terms in accordance with what is known as the “center-to-end” principle. All other known flow principles can also be implemented, however, in particular the “end-to-center” or the “end-to-end” principle.

As was described at the outset, the flow spaces 50 of the flow ducts 48 of the flow system 46 and in the process, in particular, the flow spaces 50 of the suction ducts 58 of the suction devices 54 have to be cleaned at regular intervals.

For this purpose, the oxidation furnace 10 comprises an overhaul system 72, by way of which flow spaces 50 of flow ducts 48 are accessible through the housing 12.

For this purpose, the flow ducts 48 comprise overhaul entrances 74 to the flow space 50, and the housing 12 comprises overhaul inlets 76 which in each case define an inner side 76*a* which faces the housing interior space 14 and an outer side 76*b* which points toward the surroundings of the housing 12. Flow ducts 48 are arranged on the respective inner side 76*a* of an overhaul inlet 76 of the housing 12 in such a way that their overhaul entrances 74 can be reached through the overhaul inlet 76.

The overhaul entrances 74 of the flow ducts 48 are provided separately and in addition to the flow passages which cannot be seen. The overhaul entrances 74 of the flow ducts 48 are present at one or at both of the end sides 48*a* and/or 48*b*. In a manner which is dependent on whether the flow ducts 48 have overhaul entrances 74 on one or on both of their end sides 48*c*, 48*d*, the housing 12 comprises overhaul inlets 76 in one or in both of the side walls 12*c* and 12*d* which are arranged in each case as an extension of the longitudinal axis 48*a* from associated flow ducts 48 with respect to their respective overhaul entrance 74.

First of all, exemplary embodiments will be described, in the case of which each flow duct 48 has in each case only one overhaul entrance 74 on the end side 48*c* which points toward the side wall 12*c*, and the housing 12 accordingly comprises only overhaul inlets 76 in said side wall 12*c*. In FIG. 2, overhaul inlets 76 of the housing 12 are already indicated using dashed lines in the opposite side wall 12*d*, however.

Figure 6:
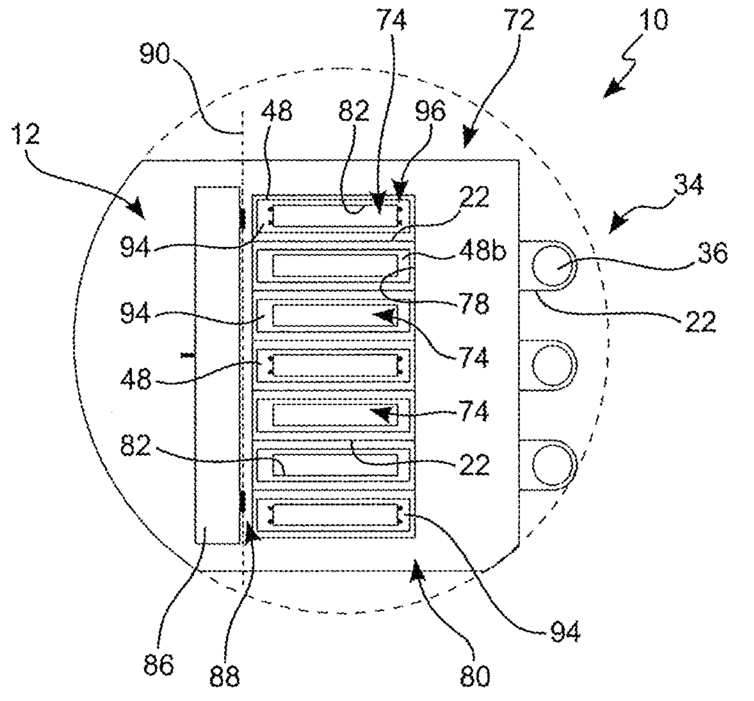
FIG. 6 shows the detail according to FIGS. 3 and 5 with a removed covering element, with the result that the duct passage openings of the flow ducts can be seen.

For each overhaul inlet 76 of the housing 12, the overhaul system 72 comprises a housing passage 78 in the housing 12 and an overhaul gate device 80, by means of which said housing passage 78 can be opened or closed. For each overhaul entrance 74 of the flow ducts 48, moreover, the overhaul system 72 comprises a duct passage opening 82 and a sealing arrangement 84, by means of which one or more duct passage openings 82 of this type can be opened or closed. The duct passage openings 82 can be seen only in FIG. 6 in the case of a removed sealing arrangement 84. The sealing arrangement 84 prevents process air from being able to flow through the overhaul entrance 74 out of the flow space 50 of the associated flow duct 48 into the process space 28 or to flow out of the process space 28 into the flow space 50, which would lead to undesired swirling and turbulence in the process space 28.

The sealing arrangement 84 can be, but does not have to be, set up in such a way that it closes the duct passage opening 82 in a flow-tight manner. In principle, a structural covering of the respective duct passage opening 82 is sufficient, however.

FIGS. 3 to 6 illustrate one exemplary embodiment, in the case of which the overhaul gate device 80 is configured at an overhaul inlet 76 of the housing 12 as an overhaul door 86 which is fastened by way of a bearing device 88 to the side wall 12*c* of the housing 12. The bearing device 88 is set up in such a way that the overhaul door 86 can be pivoted about a pivot axis 90. For this purpose, for example, the bearing device 88 can be configured as a simple swinging hinge. The pivot axis 90 is oriented vertically, but one variant is also possible, in the case of which the pivot axis 90 is oriented horizontally.

The housing passage 78 is dimensioned in such a way that, as viewed in the direction of the longitudinal axes 48*a* of the flow ducts 48, it covers all the flow ducts 48 which are arranged in the housing interior space 14 behind the overhaul door 86 on the inner side 76*a* of the overhaul inlet 76. The overhaul door 86 is thermally insulating, and its specification corresponds to that of the housing 12 of the oxidation furnace 10.

The sealing arrangement 84 is set up in such a way that all the duct passage openings 82 can be opened or closed only at the same time. For this purpose, the sealing arrangement 84 comprises a covering element 92 in the form of a covering plate which covers the end sides 48*b* of all the flow ducts 48 which are present on the inner side 76*a* of the overhaul inlet 76 and conceals the present duct passage openings 82 of the flow ducts 48.

The duct passage openings 82 are surrounded by a bearing frame 94, with the result that the cross section of a duct passage opening 82 is smaller than the cross section of the flow space 50 of the associated flow duct 48. The sealing arrangement 84 (that is to say, the covering element 92 here) is fastened by way of fastening means 96 releasably to one or more bearing frames 94 of this type. In the case of the present exemplary embodiment, the fastening means 96 are illustrated as screws, but all other known fastening technologies for a suitable releasable fastening can also be utilized, such as latching or clamping connections. The covering element for its part can also be configured as a pivoting element, and can be mounted via a corresponding hinge on the flow ducts 48.

The bearing frames 94 can also be dispensed with. In this case, a duct passage opening 82 has the same cross section as the flow space 50 of the associated flow duct 48. The fastening of the sealing arrangement 84 (that is to say, the covering element 92 here) can then take place on the outer side of the flow ducts 48, for example via a flange connection.

If an overhaul of the flow ducts 48, that is to say of the blower ducts 56 and/or the suction ducts 58, is then to be carried out, the overhaul door 86 of that overhaul inlet 76 of the housing 12 is opened, behind which the flow ducts 48 to be cleaned or to be maintained are situated. The sealing arrangement 84 is thereupon removed or moved manually in such a way that the flow spaces 50 of the flow ducts 48 are accessible and can be reached from outside the housing 10 through the duct passage openings 82 which are then exposed.

A worker can now perform cleaning or maintenance of the flow spaces 50, as known per se. After cleaning or maintenance has taken place, the sealing arrangement 84 is fastened again in its sealing position, and the overhaul door 86 of the housing 12 is closed.

Figure 7:
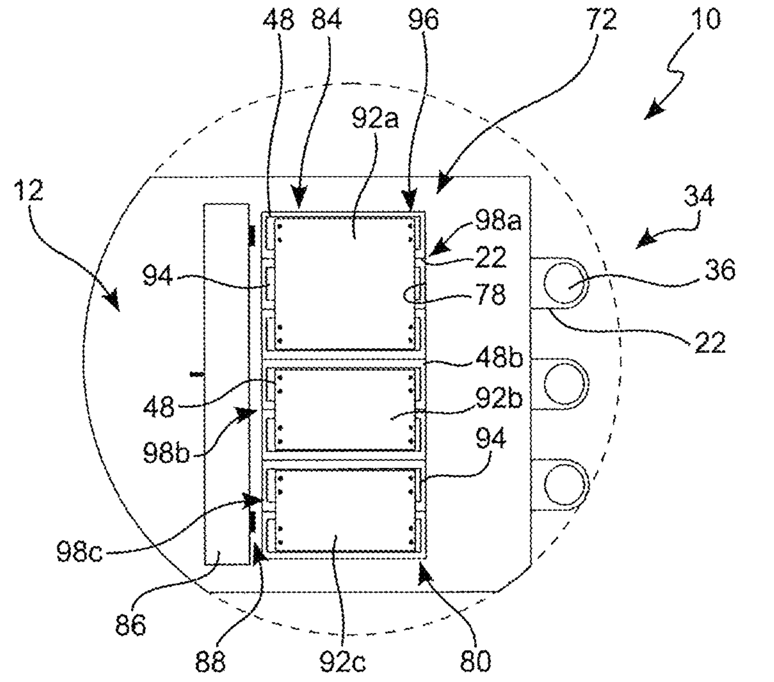
FIG. 7 shows a detail which corresponds to FIG. 5 with an open overhaul door, a modified overhaul system with a sealing arrangement being shown which comprises a plurality of covering elements for in each case one group of flow ducts.

FIG. 7 shows one modification, in the case of which the sealing arrangement 84 is set up in such a way that individual groups of duct passage openings 82 can be opened or closed independently of one another. In the case of the exemplary embodiment which is shown in FIG. 7, the total of seven flow ducts 48 which are present behind the overhaul inlet 76 define a first group 98*a* with three flow ducts 48 and a second and a third group 98*b*, 98*c* with in each case two flow ducts 48. For said groups 98*a*, 98*b* and 98*c*, the sealing arrangement 84 comprises three covering elements 92*a*, 92*b*, 92*c*, which covering element respectively covers the end sides 48*b* in each case of the groups 98*a*, 98*b* and 98*c* of the flow ducts 48 which are present on the inner side 76*a* of the overhaul inlet 76 and conceals the present duct passage openings 82 of the flow ducts 48.

Figure 8:
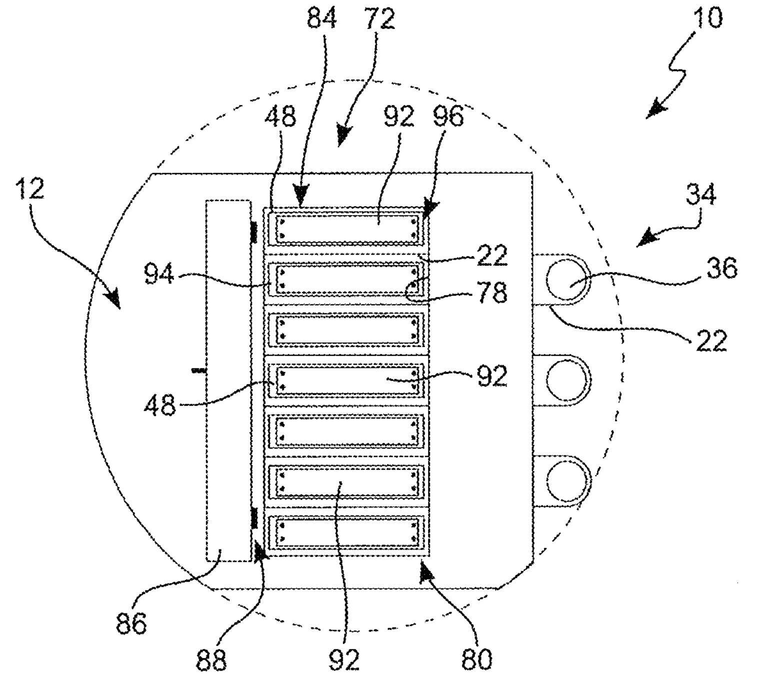
FIG. 8 shows a detail which corresponds to FIG. 5 with an open overhaul door, a once again modified overhaul system with a sealing arrangement being shown which comprises a plurality of covering elements for in each case a single flow duct.

FIG. 8 shows a further modification, in the case of which the sealing arrangement 84 is set up in such a way that individual duct passage openings 82 can be opened or closed independently. For each duct passage opening 82, as a consequence, there is an associated covering element 92 which is fastened separately to the bearing frame 94 of the relevant flow duct 48.

Figure 10:
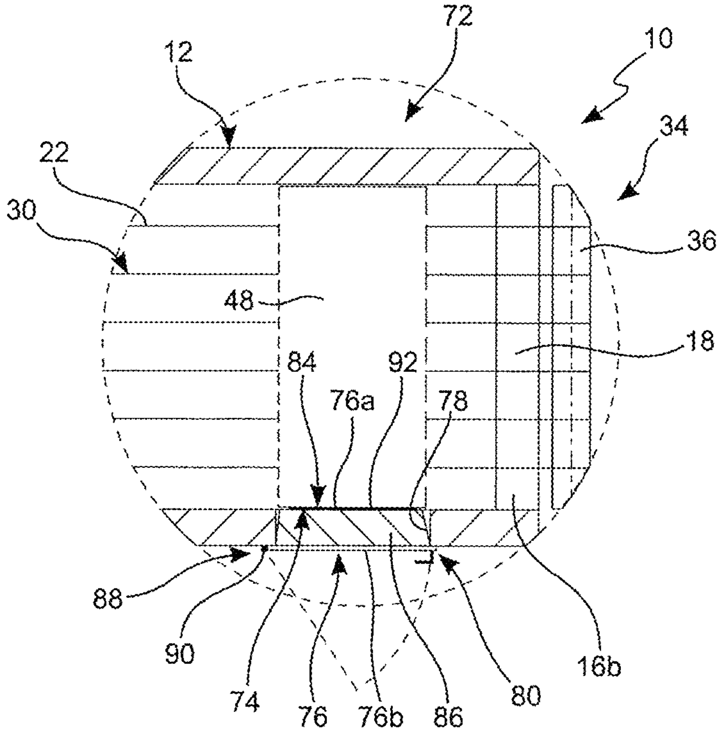
FIG. 10 shows a detail which corresponds to FIGS. 4 and 9, a modified overhaul gate device being shown, in the case of which the sealing arrangement is coupled to the overhaul door.

In the case of the bearing device 88 according to FIGS. 3 to 8, in the case of which the overhaul door 86 can be pivoted merely about the pivot axis 90, the overhaul door 86 has to taper at its vertical longitudinal edges in the direction of the process space 28, in order to obtain the movement clearance which is necessary for the pivoting movement. As a result, intermediate spaces remain between the longitudinal edges of the overhaul door 86 and the side wall 12*c* when the overhaul door 86 is closed. This can be seen in FIG. 8 and also in FIG. 10 which will be described further below.

Figure 9:
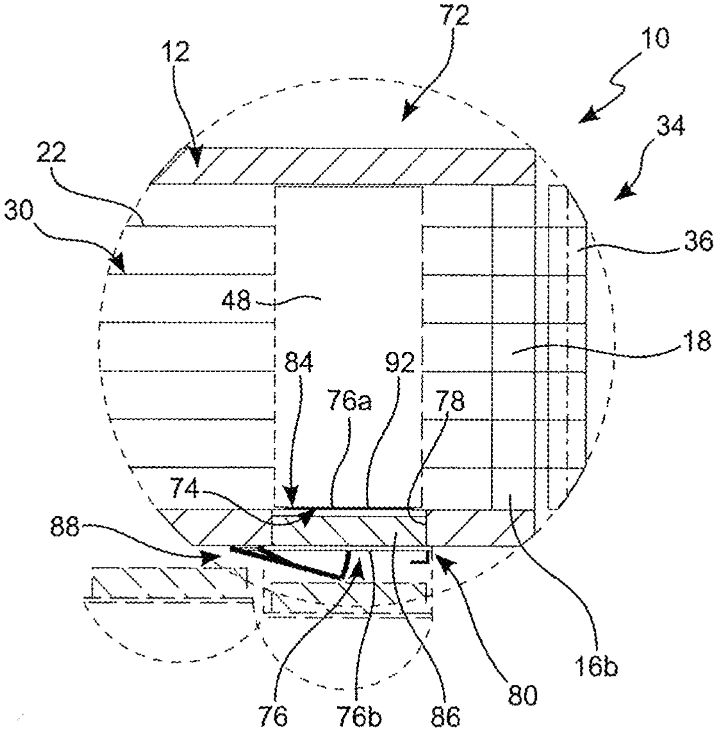
FIG. 9 shows a detail which corresponds to FIG. 4, a modified overhaul door being shown.

In the region of said intermediate spaces, however, the insulation effect of the housing 12 is reduced, and leaks to the outside can occur. Although the tightness can fundamentally be ensured even in the case of said door concept, the modified bearing device 88 which is shown in FIG. 9 provides an alternative, in the case of which improved tightness can be ensured.

The bearing device 88 there is set up in such a way that the overhaul door 86 can be moved by way of a horizontal longitudinal movement into the housing passage 78 and out of the latter again. When the overhaul door 86 is moved out of the housing passage 78, it can be pivoted and can thus be moved away from the housing passage 78. Here, it can be pivoted about a vertical pivot axis or can be moved in a parallel displacement; the latter is illustrated in FIG. 9. The bearing device 88 is indicated in FIG. 9 as a type of parallelogram guide, by means of which the described movement sequence is possible.

FIG. 10 again shows the bearing device 88 according to FIGS. 3 to 8 in the case of one variant, in the case of which the sealing arrangement 84 is moved by the overhaul door 86. This is possible independently of the bearing concept of the overhaul door 86.

In the case of the specific exemplary embodiment, the covering element 92 according to FIGS. 3 to 6 is connected to the overhaul door 86 on that inner side of said overhaul door 86 which points toward the flow ducts 48. When the overhaul door 86 closes the housing passage 78, the covering element 92 then covers the duct passage openings 82 of the flow ducts 48. When the overhaul door 86 is opened, the covering element 92 moves together with the overhaul door 86 and is moved away from the flow ducts 48, as a result of which their duct passage openings 82 become accessible.

Figure 11:
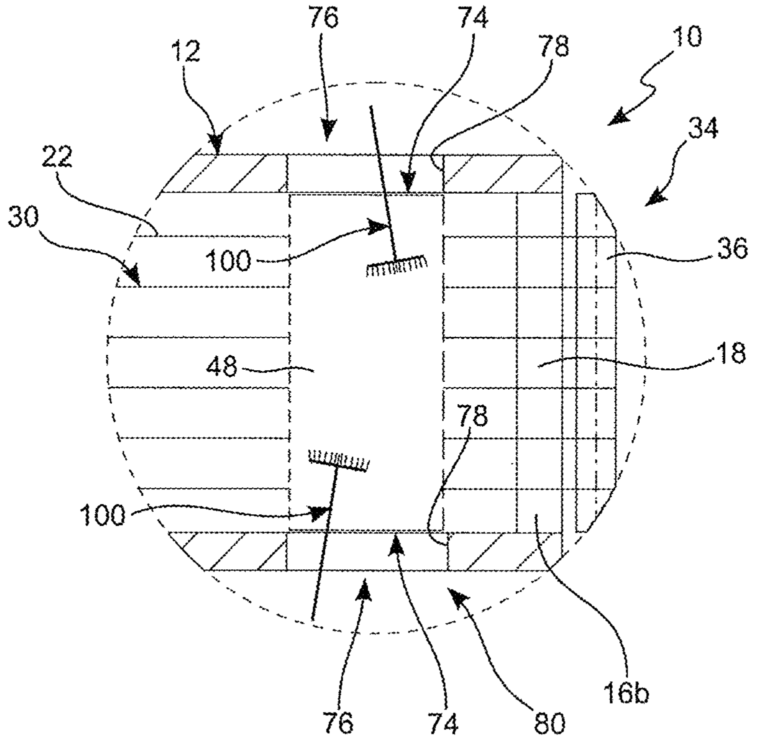
FIG. 11 shows a detail which corresponds to FIGS. 4, 9 and 10, access via the two end sides of the flow ducts firstly being illustrated and, moreover, a manual cleaning operation being illustrated.
Figure 12:
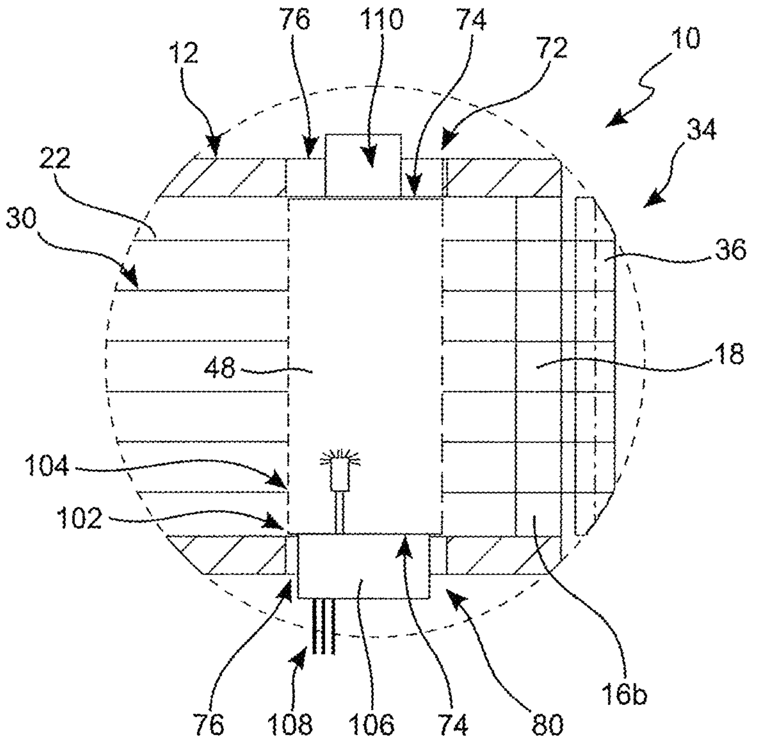
FIG. 12 shows the detail according to FIG. 11 with a modified overhaul system which comprises an automated cleaning system.

FIGS. 11 and 12 illustrate variants of one exemplary embodiment, in the case of which the flow ducts 48 are provided on both end sides 48*b* and 48*c* with a duct passage opening 82, and the housing 12 of the oxidation furnace 10 has associated overhaul inlets 76 in the two side walls 12*c*, 12*d* in the corresponding positions, the overhaul doors of which overhaul inlets 76 are not shown. Otherwise, the comments made in respect of the above-described exemplary embodiments apply mutatis mutandis.

As FIG. 11 shows, in the case of opened housing passages 78 and duct passage openings 82, the flow spaces 50 can be cleaned by one or more workers by way of manual cleaning units 100 of the overhaul system 72; FIG. 11 shows two brushes by way of example, and vacuum cleaners are also used in practice, by way of which the fiber material is extracted.

As an alternative, the overhaul system 72 can also comprise an automated cleaning device 102. This is illustrated by FIG. 12 which shows a spraying and extracting device 104 as an example for a cleaning device 102 of this type. Said device 104 comprises a spray head 106 which is positioned on a first end side 48*b* of a flow duct 48. Operating resources such as electric energy, compressed air, cleaning agents and the like can be fed to the spray head 106 via a connector unit 108.

With the aid of the spray head 106, pure cleaning agent, compressed air or else a cleaning agent/compressed air mixture can be blown as cleaning medium under high pressure into the flow space 50, as a result of which contaminants on the inner walls of the flow space 50 are detached and are received and entrained by the cleaning medium which is blown in.

An extraction head 110 of the spraying and extraction device 104 is positioned on the opposite end side 48*c* of the relevant flow duct 48, which extraction head 110 extracts and discharges the cleaning medium which is loaded with contaminants; corresponding lines are not shown for the sake of simplicity.

Corresponding fastening means for the spray head 106 and the extraction head 110 are provided on the end sides 48*b*, 48*c* of the flow ducts 48 and/or on corresponding regions in the housing passage 78.

In the case of the above-described exemplary embodiments according to FIGS. 3 to 12, the flow ducts 48 to be cleaned are formed by way of the suction ducts 58. The contaminants arise in said ducts mainly as a result of detached fiber material which is released in the case of the passage of the fibers 22 through the process space 28.

Flow ducts 48 which serve as blower ducts 56 are also contaminated over the course of time, however, with the result that cleaning and/or maintenance are/is also required there at regular intervals.

In the case of the above-described exemplary embodiments, a narrow intermediate space remains between the end sides 48*b*, 48*c* and the respective opposite side wall 12*c*, 12*d* of the housing 12. In this case, the process space 28 is flow-connected to the external surroundings of the housing 12 in the case of an open overhaul door 86 and an opened overhaul inlet 76.

In the case of a working atmosphere which is aggressive and/or harmful to the environment or to health, this can be undesired, however. In the case of one embodiment which is not shown in the figures, the flow ducts 48 can therefore extend as far as the housing passages 78 or even into the latter, the respective transition regions being gas-tight. In other words, the flow ducts 48 are connected on their first end side 48*b* and/or on their second end side 48*c* in a gas-tight manner to an overhaul inlet 76 of the housing 12.

In the case of an embodiment of this type, cleaning or maintenance of a flow duct 48 can be carried out even during running operation at least on the blower ducts 56, but possibly also on the suction ducts 58. An equalization of temperature differences can then take place by way of additional heating devices which are introduced temporarily into the flow duct 48 to be cleaned.

Moreover, the oxidation furnace 10 can comprise a monitoring system which monitors by way of a sensor device and an associated controller whether the overhaul inlets 76 of the housing 12 may be opened or not, and/or whether an overhaul inlet 76 is opened. In order to prevent this occurring during operation of the oxidation furnace 10, locking devices can be provided on the overhaul inlets 76, which locking devices prevent a corresponding overhaul inlet 76 from being opened without previous authorization by way of the controller of the monitoring system.

What is claimed is:

1. A furnace for the treatment of material, the furnace comprising:

a) a housing with a housing interior space, wherein the housing is gas-tight apart from passage regions for fibers;

b) a process space, which is situated in the housing interior space of the housing;

c) an atmosphere device configured to generate a hot working atmosphere and which comprises a flow system with flow ducts that form flow passages, wherein the flow ducts are arranged in the housing interior space and wherein each flow duct delimits one flow space, with the result that the respective flow spaces are connected in flow communication to the process space in such a way that the hot working atmosphere can be fed to the process space with at least one main flow direction and can be discharged from the process space; and d) an overhaul system, by way of which the flow spaces of the flow ducts are accessible through the housing, wherein the overhaul system includes at least one overhaul entrance, at least one covering plate that is configured to selectively cover the at least one overhaul entrance and an overhaul door that is configured to selectively cover the at least one covering plate.

2. The furnace of claim 1, wherein:

a) the flow ducts comprise the at least one overhaul entrance to the flow spaces; and b) the housing comprises at least one overhaul inlet, which defines an inner side that faces the process space and on which flow ducts are arranged in such a way that their respective overhaul entrances can be reached through the at least one overhaul inlet.

3. The furnace of claim 2, wherein a respective flow duct in the direction transversely with respect to the main flow direction defines a longitudinal axis and a first end side and an opposite second end side, and wherein an overhaul entrance is provided on the first and/or the second end side.

4. The furnace of claim 3, wherein a respective flow duct is connected on its first end side and/or on its second end side in a gas-tight manner to the at least one overhaul inlet of the housing.

5. The furnace of claim 3, wherein the housing comprises the at least one overhaul inlet in a side wall.

6. The furnace of claim 2, wherein the at least one overhaul inlet comprises a housing passage in the housing and an overhaul gate device, by way of which the housing passage can be opened or can be closed.

7. The furnace of claim 6, wherein the overhaul gate device includes the overhaul door, which is mounted by way of a bearing device that is set up in such a way that the overhaul door can be moved into the housing passage and out of the latter again in a pivotable manner about a vertical pivot axis and/or with a horizontal longitudinal movement.

8. The furnace of claim 2, wherein the flow ducts which are arranged on the inner side of the at least one overhaul inlet have a duct passage opening, and wherein the overhaul system comprises a sealing arrangement that includes the at least one covering plate, by way of which one or more of the duct passage openings can be opened or can be closed.

9. The furnace of claim 8, wherein the sealing arrangement is set up in such a way that the duct passage openings of the flow ducts which are arranged on the inner side of the overhaul inlet can be opened or can be closed either only all at the same time or in groups independently of one another or individually independently of one another.

10. The furnace of claim 7, wherein the overhaul door moves a sealing arrangement along with the overhaul door.

11. The furnace of claim 1, wherein the overhaul system comprises an automated cleaning device.

12. The furnace of claim 1, wherein the furnace is configured for the oxidative treatment of fiber material.

13. The furnace of claim 12, wherein the oxidative treatment of fiber material is configured for the production of carbon fibers.

14. A method for the treatment of material, wherein fibers are treated in a furnace of claim 1.

15. The method of claim 14, wherein the method is for the oxidative treatment of fiber material.

16. The method of claim 15, where the method for the oxidative treatment of fiber material is for the production of carbon fibers.

* * * * *